A. A. HUDSON.

HEEL BUILDING MACHINE.

APPLICATION FILED SEPT. 18, 1916.

Reissued Sept. 25, 1917. 14,368.

Inventor

Alexander A. Hudson

Witnesses:

H. E. Arthur,

W. Thornton Bogert

By Walter F. Murray

Attorney

UNITED STATES PATENT OFFICE.

ALEXANDER A. HUDSON, OF CINCINNATI, OHIO.

HEEL-BUILDING MACHINE.

14,368. Specification of Reissued Letters Patent. Reissued Sept. 25, 1917.

Original No. 1,156,842, dated October 12, 1915, Serial No. 12,753, filed March 8, 1915. Application for reissue filed September 18, 1916. Serial No. 120,896.

*To all whom it may concern:*

Be it known that I, ALEXANDER A. HUDSON, a citizen of the United States of America, and resident of Cincinnati, in the county of Hamilton and State of Ohio, have invented a new and useful Improvement in Heel-Building Machines, of which the following is a specification.

This invention relates to heel building machines and particularly to machines for building up rough heel blocks from stock leather blanks.

Heretofore, the manufacture of rough heel blocks has been carried on by means of a method of manufacture which was somewhat crude and which necessitated the expenditure of a great amount of time in building up the rough heel blocks. This method consisted in assembling the various sized blanks which are employed in building up heels, and then coating each of the blanks during the assembling operation, with glue for the purpose of holding the blanks together to form the heel block. The heel block was then placed in a clamp which was usually mounted upon a board upon which several similar clamps were mounted. After a heel block had been placed in each of the clamps, the board containing the clamps was carried by the operator or an assistant, to the drying room where the heel blocks were allowed to dry. This operation of clamping the assembled blanks in position and of carrying the clamps to a drying room, together with the time required for drying the blocks, necessitated a great amount of time expenditure, as well as necessitating the employment of additional help and of necessitating the taking up of a great amount of room in the factory in which the heel blocks were made. In order to overcome these and other objections to the heel building methods heretofore employed, I have devised the machine hereinafter described and have as an object to produce a machine which facilitates the building up of rough heel blocks from stock leather blanks.

A further object is to produce a heel building machine which will render the operation of building up rough heel blocks, one which is continuous, and one in which the entire time and attention of the operator is taken up in the single operation of building up the heel blocks.

These and other objects are attained in the machine described in the following specification and illustrated in the accompanying drawings in which.

Figure 4:
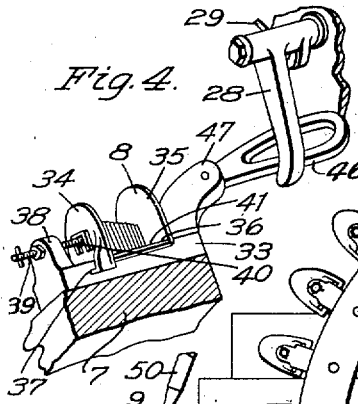
Fig. 4 is a fragmental perspective view of the clamp, the trigger for releasing the clamp, and a section of a clamp mounting means.

The machine embodying my invention comprises a frame 5, a blank assembling device 6, and a clamp support 7, which carries a series of clamps 8. The blank assembling device located at the front or operator's side of the machine is adapted to assemble the heel blanks to form the rough heel block and the clamp support 7 located at the rear of the machine is adapted to bring the clamps 8 adjacent to the blank assembling device 6, to be readily accessible in order to receive the assembled heel blanks.

The heel assembling device 6 consists of three fingers 9 which extend above the plate 10 forming the table of the device, and are adapted to be operated to move inwardly upon the assembled blanks located between them. The means employed for operating the fingers 9 consists of a series of links 11 which are connected at their outer ends with arms 12 carrying the fingers 9, while at their inner ends they are connected to a rod 13 which is centrally disposed with relation to the other portions of the device and which passes through a hollow shaft 14 upon the outer surface of which screw threads are provided. The upper end of this hollow shaft passes through a bracket 15 and is adapted to cause the bracket to move upwardly or downwardly upon the screw threads when the shaft is rotated. This movement of the bracket 15 is for the purpose of adjusting the height of the fingers 9 above the plate 10 to adjust the machine for use in building up heels of different sizes. The lower end of threaded shaft 14 is mounted in a plate 16 which is spaced from the table 10 and is supported by rods 17 secured to the under side of the table. A hand wheel 18 is provided for the purpose of adjusting the screw threaded hollow shaft 14 in the bracket 15 for the purpose of properly adjusting the fingers 9. In order to operate the fingers, the rod 13 which is connected with the links 11 at its upper end, is connected at its lower end with a rod 19 which connects at its lower end with a treadle bar 20 pivotally mounted in the frame adjacent to the bottom of the machine. This treadle bar extends forwardly and is supplied with a treadle 21 for the purpose of enabling the operator to operate the fingers 9. A spring 22 connected with the treadle bar 20 and the plate 16, is provided for returning the treadle bar to its normal position and for opening the fingers 9 to release the assembled blanks.

Figure 1:
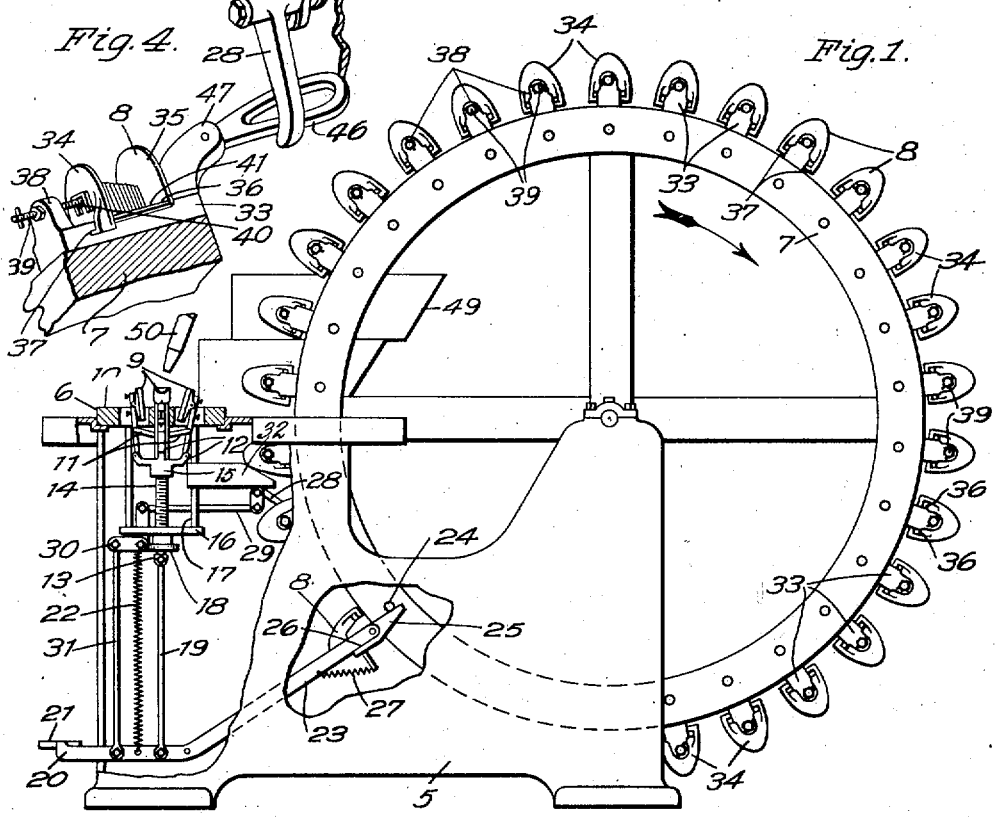
Figure 1 is a side elevation of a machine embodying my invention.

The clamp support 7 is built in the form of a large wheel which is journaled to stand vertically at the rear of the frame and is provided on its periphery with a series of clamps 8 adapted to receive the heel blanks which have been assembled in the blank assembling device 6. This wheel is so located with relation to the blank assembling device 6 that the clamps, during the rotation of the wheel, are brought into position adjacent to the assembling device in order to receive the assembled blocks as they are delivered from the assembling device. This wheel or clamp support 7 is adapted to be rotated in the dirction of the arrow as shown in Fig. 1, and is adapted to be rotated in a step by step motion in order to bring the unoccupied clamps adjacent to the blank assembling device in order to receive the assembled blanks as they are taken from the device. The clamps are spaced at intervals about the wheel and are adapted to be moved into position by the operator, who gives the wheel a slight rotation each time a fresh heel blank is placed in a clamp or the wheel may be operated by a mechanism similar to the mechanism illustrated in Fig. 1, which consists of a rearward extension 23 of the treadle bar 20, and which extends adjacent to and alongside of the rim of the wheel or clamp support 7, for the purpose of engaging pins 24 located at intervals on the rim. The end of the extension 23 is however, provided with a pawl 25 which is pivotally mounted at the end of the extension and is provided with a finger 26 which extends beneath the extension 23 and into engagement therewith for the purpose of preventing the pawl 25 from being pushed backwardly when the extension 23 is operated, but to permit the pawl to be moved upwardly upon the return of the treadle bar 20 to its normal position as shown in the drawings. A spring 27 is connected with the extension 23 and with the finger 26 for the purpose of permitting the pawl 25 to have yielding motion in passing over the next adjacent pin when the bar 20 returns to its normal position.

For the purpose of releasing the clamps 8 in order to permit the heel blocks which have been placed therein, to be removed, I have provided a trigger 28 which is located adjacent to the operating handle 46 of each clamp, and is pivotally mounted in the side member of the frame 5. The trigger is adapted to be operated by means of a crank which is connected with a rod 29 extending toward the front of the machine and which is connected at its opposite end to a bell crank 30 secured to the plate 16. The free end of the bell crank 30 is connected in turn with a rod 31 which connects the bell crank with the treadle bar 20 as shown. Through this mechanism the successive clamps are released when the operator places his foot upon the treadle bar 20 and causes it to be released. This releasing of each successive clamp mounted on the clamp support 7, causes the heel blocks to be released from the clamps and to fall into a suitable container located beneath the clamps. I have found however, that at times the heel block refuses to fall from the clamp because of glue having accumulated on the outer surface of the heel block and thereby causing the heel to adhere to one or the other of the jaws of the clamp. For the purpose of releasing these heel blocks I have provided therefor a releasing finger 32 which is secured to one of the rods 17 supporting the plate 16, and which extends into position between the jaws of the clamps and is adapted to knock the heel blocks from the clamps as the wheel rotates.

Figure 2:
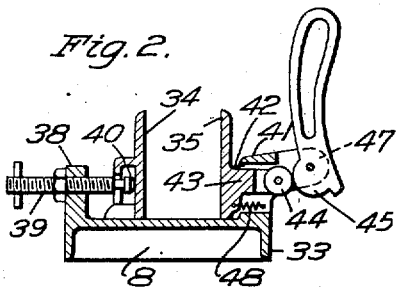
Fig. 2 is a side sectional elevation of a clamp embodying a detail of my invention.
Figure 3:
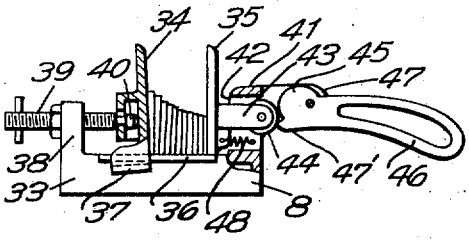
Fig. 3 is a side fragmental sectional elevation of the clamp illustrated in Fig. 2 and showing a rough heel block located in the clamp.

The clamps in themselves consist of a base 33 upon which are reciprocally mounted clamp jaws 34 and 35. The clamp jaw 34 is free to move upon the base 33, and is secured to the base by means of outwardly extending flanges 36 which are adapted to coöperate with inwardly extending flanges 37 formed on the clamp jaw. This means of securing the clamp jaw, permits it to move reciprocally along the base, but prevents the clamp jaw from becoming detached therefrom except at the end of the base adjacent to the lug 38. Mounted in the lug is a screw threaded stud 39 which is provided with a head 40 located in a recess formed at the back of the clamp jaw 34 and is adapted to provide means for adjusting the position of the clamp jaw 34 with relation to the clamp jaw 35. The clamp jaw 35 is also reciprocally mounted on the base 33, but is mounted in a manner somewhat different to that of the clamp jaw 34. At the opposite end of the base 33 is provided a lug 41. In a recess 42 formed in this lug, a bearing lug 43 which extends from the rear face of the jaw 35, is reciprocally mounted. This journal lug 43 is provided with a roller 44 which is adapted to bear against a cam face 45 of a clamp operating handle 46 which is pivotally mounted in a fork 47 extending beyond the lug 41. In order to retain the roller 44 in engagement with the cam face 45 of the clamp operating handle 46, a spring 48 which is secured to the lug 41 at one end and to the clamp jaw 35 at its other end, is provided. The cam face 47 of the clamp operating handle 46, is so shaped as to permit the clamp jaw 35 to move away from the clamp jaw 34 when the handle is thrown upwardly as shown in Fig. 2, and to cause the jaw 35 to move toward the jaw 34 when the handle is moved to the position shown in Fig. 3. A stop 47′ is provided at the end of the cam face 45 for the purpose of preventing the handle 46 from being thrown too far beyond its position in alinement with the journal lug 43 and adjustment stud 39. Owing to the wedge shaped construction of rough heel blocks, the jaw 34 is loosely mounted on the head 40 of the adjustment stud 39 and upon the flanges 36 of the base 33, to permit the jaw to adjust itself to the angle of the heel blank as shown in Fig. 3.

In operation:

The operator is located at the front of the machine in order to be readily accessible to the treadle 21 and to be within reach of the bins 49 from which he may select the proper sizes of heel blanks from which to build up the rough heel blocks. In this position the operator selects the proper sizes of heel blanks from the bins 49 and places them upon the table 10 between the fingers 9 of the blank assembling device. The blanks are assembled in such a manner that the largest blank is placed upon the table and the blanks are placel one upon another according to their diminishing sizes, until the outline of a rough heel block is produced. With the blanks thus stacked between the fingers, the operator places his foot upon the treadle 21 and through its connected mechanism, causes the fingers 9 to grasp the heel blanks and to hold them in position until the blanks can be properly secured together. During the assembling operation the operator may either coat the surfaces of the blanks with a quick drying glue, or he may employ a method which is employed by me in building rough heel blocks by means of my improved machine. This method consists in first coating the sheets of leather from which the heel blanks are cut, with a quick drying glue which is allowed to dry before the blanks are cut. When each of the blanks is subjected to a mixture of steam and water mist from a pipe 50 as shown in Fig. 1, the glue coating of each of the blanks will be moistened and the glue will become softened so that when the blanks are secured together in the nailing and subsequent clamping operations, the glue will cause the blanks to become firmly united. After the nailing operation above described, the operator releases the treadle 21 to permit the fingers 9 to move away from the heel block. The block is then removed from between the fingers and is placed in the clamp immediately back of the fingers. The handle 46 of the clamp is then moved to cause the jaws to come together in clamping engagement upon the heel block. Owing to the wedge shaped formation of the heel block, the jaw 34 will turn and adjust itself to the heel block as shown in Fig. 3. The operator then selects more blanks from the bins 49 and places them in proper order between the fingers 9 to form another heel block. After these blanks have been assembled the operator again operates the treadle 21 to bring the fingers 9 together. In this operation of moving the treadle 21, the pawl 25 on the extension 23 of the treadle bar 20, which is in engagement with the pin 24 on the clamp support 7, moves upwardly to cause the clamp support to rotate the distance between adjacent clamps. This rotation of the clamp support causes the clamp which was previously filled, to be moved upwardly away from the blank assembling device, and to bring another clamp into position to receive a new heel blank from the blank assembling device. In this manner the clamp support is rotated in a step by step manner until the clamp which contains the first made heel block, reaches a point adjacent to the trigger 28 of the releasing mechanism. By this time, the glue, owing to the slow movement of the clamp support 7, has become thoroughly dried, and the heel block is in condition to be removed from its clamp. The releasing of this first made heel block is accomplished when the operator again operates the treadle 21 in assembling more blanks to construct another heel block. In operating the treadle, the trigger 28 is caused to release the clamp containing the first made heel block, through its operating mechanism 29, 30 and 31. The manner of causing the trigger to release the clamps is more clearly illustrated in Fig. 4, and consists in bringing the trigger into engagement with the operating handle of each successive clamp, to throw the handles from the position illustrated in Fig. 4 to the position illustrated in Fig. 2. With the clamp thus released the heel block is permitted to fall into a suitable receptacle located beneath the clamps. If however, the heel block should refuse to leave the clamp because of having become stuck to either one of the clamp jaws, the releasing finger 32 causes the block to be removed from between the clamp jaws upon the next movement of the clamp support. In machines not provided with the clamp support operating mechanism above described, the operator steps up the clamp support by hand in order to move a fresh clamp into position, each time he places a fresh heel block in one of the clamps.

Whether the clamp support is operated by hand or by means of the mechanism disclosed in the drawings, the releasing of the clamps previous to their reaching the table, and the removal of the heel blocks therefrom, causes the clamp support to become somewhat overbalanced by the weight of the heel blocks occupying the clamps diametrically opposite to the clamps from which the heel blocks have been removed. This results in giving the clamp support a tendency to rotate without assistance. Because of this the impulse which the operator may have to give the clamp support in order to rotate it, is small. This permits the time consumed in the operation of assembling and clamping the heel blocks, to be reduced materially, the operator not having to spend much time and attention to rotate the support in order to bring empty clamps into position to receive fresh heel blocks.

In my improved gluing method above described, the pipe or nozzle 50 is permanently located adjacent to the fingers 9 of the assembling device, and is adapted to constantly direct a stream of atomized water and steam upon the surfaces of the successive blanks as they are placed one upon another between the fingers 9. When the last blank is ready to be placed in position on the top of the assembled blanks, the operator cuts off the flow of steam and water mist and thereby avoids moistening the top surface of the assembled blanks. This leaves the top surface dry so that when the blanks are placed in the clamps after having been properly nailed together, there is little or no tendency for the blanks to stick to the surfaces of the clamp jaws when the clamps are released after having passed through one rotation of the clamp support 7.

It will be seen that by means of a machine embodying my invention, the operation of building heel blocks may be carried on in a much more rapid and at the same time a much more efficient and satisfactory manner than heretofore, and in addition to this the operation will be a continuous one in which the operator has nothing to attend to other than the assembling of the heel blanks and the placing of them in the clamps. This eliminates the necessity of the operator having to stop his work from time to time in order to carry clamps in which he has previously placed heel blanks to dry, to the drying room, and of having to bring back empty clamps ready to receive freshly made heel blocks as they are turned out by the assembling device. By means of my machine it is unnecessary to have to wait for clamps to become available since the clamps are constantly being returned empty to the operator without having to cease his heel building operations. In addition to this as previously mentioned the necessity of employing assistants, is to a great extent eliminated, and the machine is compact enough to occupy comparatively little space in the factory.

Having thus described my invention, what I claim is:

1. In combination in a heel building machine, a blank assembling device, clamps, a rotatable support for said clamps located adjacent to said assembling device, a treadle bar, and means operatively connecting the treadle bar with the clamp support and the blank assembling device, whereby movement of said treadle bar causes simultaneous movement of said assembling device and said clamp support.

2. A heel building machine comprising a blank assembling device, a series of clamps rotatively mounted adjacent to the assembling device, and means adapted to simultaneously operate the assembling device and release the clamps.

3. In a heel building machine the combination of a blank assembling device, a series of clamps rotatively mounted adjacent to the assembling device, and means adapted to simultaneously operate the assembling device, rotate the clamps, and release the clamps.

4. In combination in a heel building machine, a blank assembling device, a series of clamps, and a vertically rotatable wheel adapted to mount the clamps on its rim adjacent to the blank assembling device, each of said clamps consisting of a base, a jaw reciprocally mounted at one end of the base, a jaw adjustably mounted at the opposite end of the base, means adapted to swivelly mount the second mentioned jaw in its adjusted positions, and a second means adapted to move the first mentioned jaw toward the second mentioned jaw to clamp a heel block between them.

5. A heel building machine consisting of a vertically positioned wheel, a series of heel clamps mounted upon each quarter of the wheel and adapted to receive freshly glued heels and means to impart a step by step rotation to the wheel, whereby the step by step movements necessary to make one revolution of the wheel consume the time necessary for the glue to set.

6. In a heel building machine, the combination of a table, a wheel positioned vertically adjacent to the table, a series of clamps positioned upon each quarter of the wheel and adapted to receive freshly glued heels, a clamp releasing mechanism mounted adjacent to the table and means to impart a step by step movement to the wheel whereby in one revolution of the wheel the glue may be set and the heel released from its clamp upon its return to the table.

ALEXANDER A. HUDSON.

Witnesses:
WALTER F. MURRAY,
W. THORNTON BOGERT.